United States Patent
Kogelnik et al.

[11] 4,012,113
[45] Mar. 15, 1977

[54] ADJUSTABLE OPTICAL SWITCH OR MODULATOR

[76] Inventors: Herwig Werner Kogelnik, 118 Buttonwood Drive, Fair Haven, N.J. 07701; Ronald Vernon Schmidt, 323 Arlene Terrace, Matawan, N.J. 07747

[22] Filed: Dec. 17, 1975

[21] Appl. No.: 641,649

[52] U.S. Cl. .......................... 350/96 C; 350/96 WG
[51] Int. Cl.² .......................................... G02B 5/16
[58] Field of Search ................. 350/96 WG, 96 C

[56] References Cited
UNITED STATES PATENTS

| 2,948,864 | 8/1960 | Miller | 333/10 |
|---|---|---|---|
| 3,408,131 | 10/1968 | Kapany | 350/96 C |
| 3,883,220 | 5/1975 | Taylor | 350/96 C |

OTHER PUBLICATIONS

Taylor "Optical-waveguide Connecting Networks" Electronic Letters vol. 10, No. 4 pp. 41–43 Feb. 1974.
Papuchon et al. "Electrically Switched Optical Directional Coupler" App. Phys. Letts. vol. 27 Sept. 1975 pp. 289–291.
Papuchon et al. "Electrically Switched Optical Directional Coupler" IEEE Journal of Quant. Elect. vol. QE11, article 13.B4.
Campbell et al. "GaAs Electro-optic Directional Coupler Switch" App. Phys. Letts. vol. 27 Sept. 1975 pp. 202–204.

*Primary Examiner*—John K. Corbin
*Assistant Examiner*—Stewart Levy
*Attorney, Agent, or Firm*—Wilford L. Wisner; Daniel D. Dubosky

[57] ABSTRACT

An optical switch of the switched directional coupler type is provided with an adjustable cross-over state as well as an adjustable straight-through state, in order to provide reduced crosstalk in the cross-over state, for example, when the switches are used in an optical switching system. The improved switch is based on asynchronous or phase-mismatched coupling between two parallel optical strip guides driven by electrodes to which the voltage is applied. In order to use phase-mismatched coupling instead of phase-matched coupling for the cross-over state, in order thereby to obtain electrical adjustability of that state, the driving electrodes are split into two or more sequential sections, thereby defining two sequential coupling sections of the parallel optical strip guides. The cross-over coupling is then achieved by switching the mismatch conditions so that at the point of partial coupling the "nonoriginating" guide appears to the coupled optical waves to be the "originating" guide.

12 Claims, 13 Drawing Figures

RELATIVE V₁ AND V₂ POLARITIES SHOWN FOR TYPICAL "CROSS" STATE

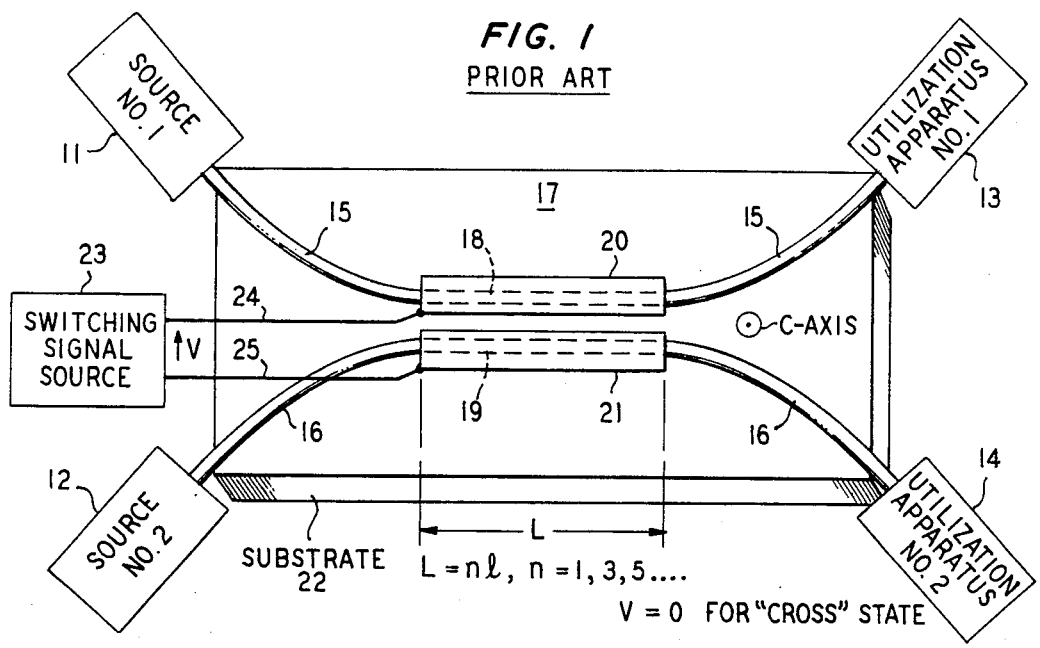
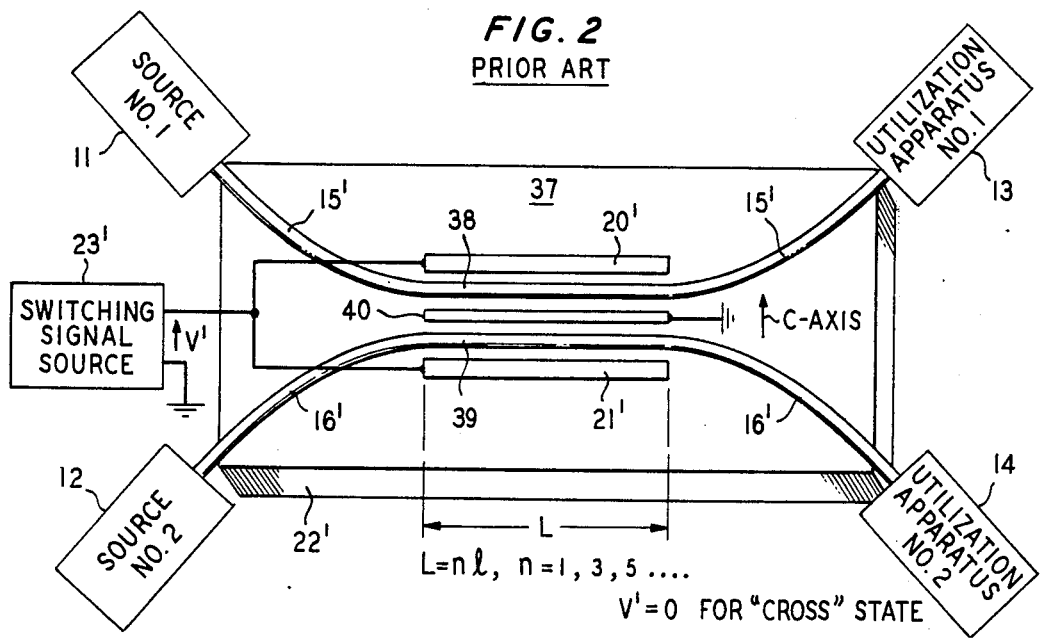
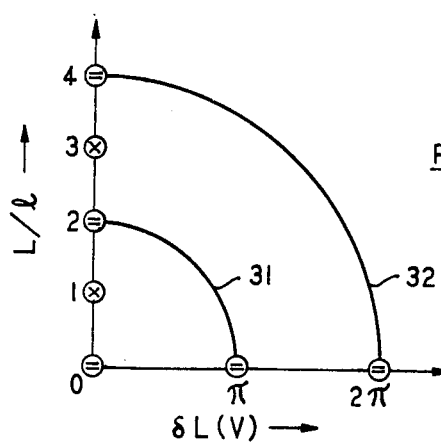

"BAR" STATE
(STRAIGHT-THROUGH)

"CROSS" STATE
(CROSS-OVER)

RELATIVE $V_1$ AND $V_2$ POLARITIES SHOWN FOR TYPICAL "CROSS" STATE

RELATIVE $V_1$ AND $V_2$ POLARITIES SHOWN FOR TYPICAL "CROSS" STATE

ADJUSTABLE OPTICAL SWITCH OR MODULATOR

BACKGROUND OF THE INVENTION

This invention relates to optical switches employing controllable asynchronous or phase-mismatched coupling between two parallel optical guides and having electrical adjustability of both cross-over and straight-through states.

In prior experimental investigation of alternatives for optical switches, it has been proposed that optical directional couplers employing dielectric strip guides or "channel" guides fabricated in electrooptical material or semiconductor material and controlled by an applied electric field can serve as amplitude modulators or as switches of information-carrying optical channels. Examples of such proposals are U.S. Pat. No. 3,408,131 (1968) to Mr. N. S. Kapany and the article by Mr. E. A. J. Marcatili in the Bell System Technical Journal, Volume 48, page 2071 (1969). In principle, the switching function can be obtained by control of either the coupling strength between the two waveguides or of the difference $\Delta\beta$ of the two propagation constants, the latter being the phase mismatch or asynchronism of the respective guides.

Nevertheless, it was soon recognized that the control of phase mismatch is preferable as it requires drive voltages that are about two orders of magnitude smaller than the direct control of coupling strength. Implementations of such control techniques that utilize changes in the propagation constants or phase velocities of two adjacent waveguides to perform switching are described in the articles by Mr. M. Papuchon et al, *Applied Physics Letters*, Volume 27, page 289 (September 1975) and by J. C. Campbell et al., *Applied Physics Letters*, Volume 27, page 202 (August 1975). Since this type of switching involves changes in the difference between the propagation constants which are usually designated as $\beta$, the switching is commonly referred to in the art as $\Delta\beta$ switching. The first of the latter two articles describes structures in lithium niobate and the latter describes structures in gallium arsenide.

The devices just mentioned appear to perform acceptably as amplitude modulators; but they apparently do not produce optical switching that meets the stringent crosstalk requirements demanded by a typical communication system. One of the reasons for this difficulty is the fact that the just-mentioned directional couplers allow the electrical adjustment of only one of the two switching states.

It is therefore desirable to improve the prior art optical directional couplers to overcome the problems of such limited electrical adjustment.

SUMMARY OF THE INVENTION

In accordance with our invention, an optical switch of the type employing a $\Delta\beta$-switched directional coupler is provided with electrical adjustability of both switching states. Our invention is based on our discovery that, under conditions of asynchronous or phase-mismatched coupling, it is possible to "fool the photons," or to reverse the phase-mismatch conditions so that the interacting waves see the two strip guides as if they had been interchanged. From the viewpoint of the mathematics describing the waves, the energy returns to the "originating" guide; but optically; the loci of constructive interference of waves in the two guides have been changed so that the guide to which coupling is desired appears to be that "originating" guide. Unlike the prior art $\Delta\beta$-switched directional coupler, our device never employs exact phase matching or synchronism.

In accordance with a principal feature of our invention, the possibility of this type of operation is obtained by splitting the electrodes of the coupler to define at least two sequential sections having phase mismatches $\Delta\beta$ of opposite signs. The cross-over is now achieved by having opposite, but not necessarily equal phase mismatches in the two sections, since the peak partial coupling at the end of the first section is not necessarily 50 percent and since the actual lengths of the two coupling sections are also not necessarily equal. In any event, the voltages applied to the two sequential sections can be mutually adjusted to assure the complete cross-over, so that negligible crosstalk is obtained in a switching system application of the invention.

Advantageously, this new type of coupling also yields a more versatile modulator.

According to a subsidiary feature of our invention the more conventional phase-mismatched state of the device, used for the straight-through state, can be more versatilely achieved than in the prior art, that is, either by increasing the difference in the drive voltages used for the cross-over state by an amount peculiar to the split, sequential-section structure or by switching the polarity of voltage on one section of the coupler so that both sections together closely resemble the prior art $\Delta\beta$-switched directional coupler in its straight-through state.

BRIEF DESCRIPTION OF THE DRAWING

Further features and advantages of our invention will become apparent from the following detailed description, taken together with the drawing, in which:

FIGS. 1 and 2 show typical prior art arrangements of the $\Delta\beta$-switched directional coupler;

FIG. 3 shows a typical switching voltage versus a normalized interaction length diagram for the prior art $\Delta\beta$-switched directional coupler;

DESCRIPTION OF ILLUSTRATIVE EMBODIMENT

Figure 4:
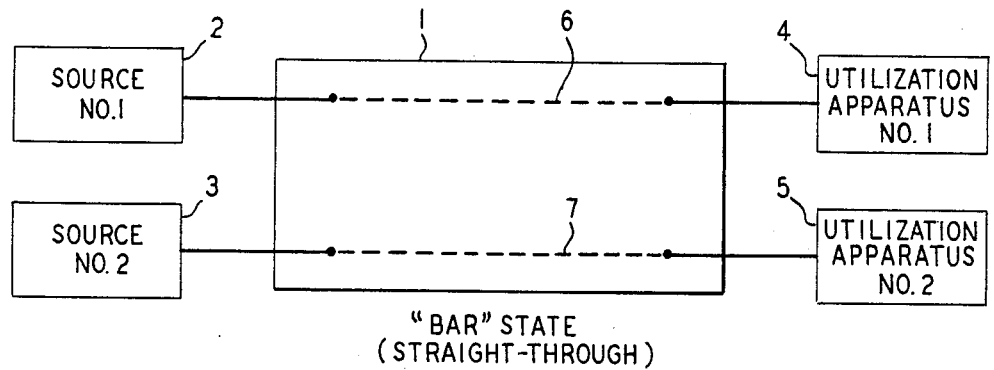
FIGS. 4 and 5 show in block diagrammatic form the elementary switching states of the $\Delta\beta$-switched directional coupler, whether of the prior art type or that of our invention.

To understand the structure and operation of the invention, it is first necessary to understand the structure and operation of the prior art switched optical directional coupling, as shown in FIG. 1. More specifically, the device shown in FIG. 1 as prior art is the device which is commonly called the COBRA by the French workers in the art. See the article by M. Papuchon et al. cited above.

The device 17 includes the lithium niobate substrate 22 on which are disposed the optical strip guides 15 and 16 having portions 18 and 19 which are parallel and each within the evanescent light field of the other for a distance $L$ which is an odd integral number times the coupling length $l$. That is, $$L = nl, n = 1, 3, 5 \ldots \tag{1}$$

A coupling length $l$ is the distance over which the light traveling in one of the strip guides 18, 19 would be completely transferred to the other, if they are perfectly phase-matched. This type of transfer occurs reversibly and in an oscillatory manner with each successive coupling length. The distance $L$ is also the distance over which the driving electrodes 20, 21 are disposed over the parallel strip guides 18 and 19. Typically, the guides 15, 16, 18 and 19 are made of titanium-diffused lithium niobate in the substrate 22, so that the strip guides have a higher refractive index than the substrate 22. Connected to strip guides 15 and 16 are two sources, 11 and 12, and two corresponding utilization apparatuses 13 and 14. When the lithium niobate material system is used in device 17, sources 11 and 12 can be almost any coherent source, such as a laser, the light output of which can be readily injected into guides 15 and 16. The sources 11 and 12 in a meaningful system, of course, would also include means for modulating the light beam so that a customer, facility or other source of information at a station or place at which source 11 is located can communicate to another customer, facility or responsive device located at another station or place, such as appropriate utilization apparatuses. Accordingly, the apparatuses 13 and 14 would typically include detectors for detecting modulations of the light beam. The electrodes 20 and 21 are connected to respective terminals 24 and 25 of switching signal source 23, which, for example, could be controlled by the network control signalling apparatus (not shown) of a telephone system.

In operation of the prior art device of FIG. 1, when the voltage V is zero, the directional coupler 17 is in the cross-over state, hereinafter called the "cross" state, of the switch. Hopefully, the distance $L$ has been selected precisely enough that the customer at source 11 is talking to a customer at apparatus 14 and a customer at source 12 is talking to a customer at apparatus 13 without any crosstalk between the two communication paths. That is, in each beam all of the light wave is coupled across and no residual part thereof remains in its original guide.

It should be clear that the system is reciprocal and that apparatuses 13 and 14 can also employ sources to transmit modulated light beams toward the apparatuses 11 and 12, which were called sources for convenience. For each of these transmissions the switch, that is the directional coupler 17, is in the cross state.

Figure 5:
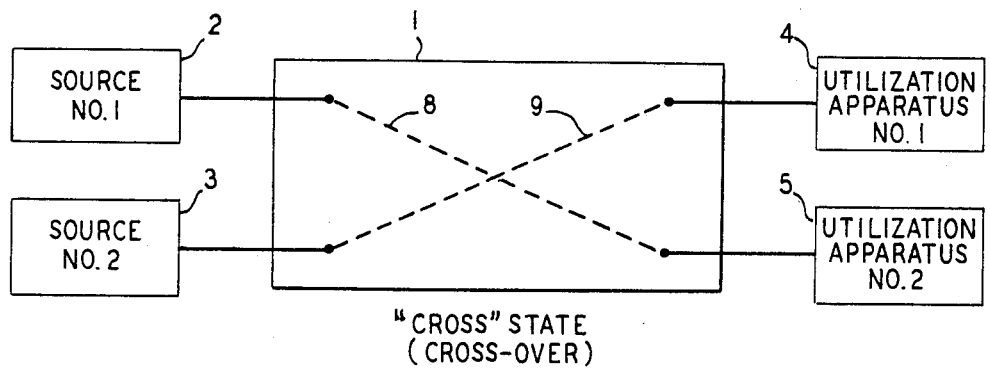

The preceding description of the cross state may be perhaps better understood by examining the block diagram of FIG. 5. FIG. 5 is simplified to eliminate the uniquely optical aspects of the prior art in the present invention, thereby showing that the cross state is like one position of a double pole, double-throw switch.

Likewise the "straight-through" state, hereinafter called the "bar" state, may be simply illustrated as in FIG. 4; again freed of its optical aspects, it is seen that the bar state corresponds to the other position of a double pole, double-throw switch.

In other words, when the drive voltage V is applied to the electrodes 20 and 21 of FIG. 1, it introduces a phase mismatch $\Delta\beta$ which spoils the directional coupling between guides 18 and 19. If the voltage is appropriate to make $L$ now appear to be an even integral number of coupling lengths, then the net coupling of the parallel guides is spoiled completely. That is, light which is completely transferred by the midpoint of the coupling region is transferred back again before it is out of the influence of the electric field.

It should be clear that, even if the parallel portion $L$ has not been fabricated precisely to the proper number of quiescent coupling lengths, there is still a voltage which will make $L$ appear to be an even integral number of coupling lengths regardless of the transmission path and its direction. Such a voltage can be called the $\pi$ voltage or $2\pi$ voltage as shown by curves 31 and 32 in FIG. 3. In FIG. 3 the ratio of $L$ to $l$ is shown on the vertical axis, the ordinate, and the quantity $\delta L$, where $\delta = \frac{1}{2}\Delta\beta$, which is a function of voltage, is shown along the horizontal axis, the abscissa, in a normalized form. Curves 31 and 32 in FIG. 3 represent the bar states of the switch, which are clearly adjustable.

While phase-matched coupling can be spoiled by either an improper length of coupled guides or by phase mismatch or asynchronism in two guides of proper length for coupling, the very ease of spoiling the coupling makes it more difficult to achieve the phase-matched coupling which is necessary to the cross state. In other words, two conditions must be satisfied simultaneously. These conditions are synchronism or continuous phase-matching and the appropriate length of the interaction. They are independent conditions. A discrepancy in one cannot be removed by introducing a discrepancy in the other. In fact, in general, such attempts degrade the operation of the device.

Nevertheless, closer analysis shows that, as the operation of the device is degraded, light that is partially coupled from one guide to another tends to return to the guide in which it originated. Our invention therefore is based on our recognition that it is possible to switch the appearance of the "originating guide" as it appears to the interacting waves so that, with the coupling process partially complete, the light can be induced to "return" to the guide to which coupling is desired. Indeed, this property is achieved without any synchronism ever having been obtained in the entire coupling process, provided only that a substantial partial coupling can be achieved before the switch in apparent identity of the guides is accomplished. The effect is achieved by switching the sense of the phase-mismatch midway through the device, as will become clearer hereinafter.

The foregoing analysis of the operation of the prior art device can be restated in a way from which we can show mathematically why our multiple-sequential-section coupler will work.

The complex amplitudes $R$ and $S$ of the light at the output of the two guides are linearly related to the corresponding input amplitudes $R_0$ and $S_0$, which we can write in matrix notation $$\begin{pmatrix} R \\ S \end{pmatrix} = \begin{pmatrix} A & -jB \\ -jB^* & A^* \end{pmatrix} \begin{pmatrix} R_o \\ S_o \end{pmatrix}. \qquad (2)$$

The coefficients are given by $$A = \cos[L\sqrt{\kappa^2+\delta^2}] + j\delta \sin[L\sqrt{\kappa^2+\delta^2}]/\sqrt{\kappa^2+\delta^2}, \qquad (3)$$

$$B = \kappa \sin[L\sqrt{\kappa^2+\delta^2}]/\sqrt{\kappa^2+\delta^2}, \qquad (4)$$

where $\delta = \frac{1}{2}(\beta_R - \beta_S) = \Delta\beta/2$, $L$ is the interaction length, and $\kappa$ is the coupling coefficient, which we assume to be independent of $V$.

In terms of Equation (2) then, ideally, the device 17 has two switching states, the bar state where $|A| = 1$ and $B = 0$, so that no light is switched from one guide to the other and the cross state where $A = 0$ and $|B| = 1$, so that all the light is switched. Inspection of Equations (3) and (4) shows that there is always a voltage or $\Delta\beta$ which can put the switch into the bar state; but in order to achieve the cross state we need $\Delta\beta = 0$ and $\kappa L = \pi/2(2n+1)$ where $n$ is an integer 0, 1, 2, .... In other words, there is needed both phase matching and an interaction length $L$ which for zero crosstalk must be exactly equal to an odd multiple of the coupling length $l = \pi/2\kappa$, which is related to the coupling strength. If the correct $L/l$ value, 1, 3, 5 ..., has not been obtained during the fabrication of the device, it is impossible to adjust the voltage to switch the device into the cross state because both conditions cannot be achieved simultaneously; and, therefore, crosstalk results.

The same problems exist for the horizontal electric field version of the prior art switched directional coupler as will now be discussed with respect to FIG. 2. It may be noted that in FIG. 1 the optic axis, the C-axis of the lithium niobate, was orthogonal to the surface of the substrate; and the principal effective components of the electric field were parallel to that axis.

In the device of FIG. 2 it is possible to reduce the required drive voltages, as a larger electrooptic coefficient can be utilized, if a sufficiently fine electrode structure 40 can be fabricated between the parallel portions 38 and 39 of the switched directional coupler 37. In this case, the optic axis, the C-axis of the lithium niobate, is parallel to the surface of the substrate 32 and orthogonal to the direction of the guide portions 38 and 39. The electrode strips 20' and 21' are disposed outside of guide portions 38 and 39 and have applied to them the same electrical potential from switching signal source 23'; whereas the other terminal of source 23' is connected, for example, by the common of the system to the center electrode 40.

The same operational problems exist here, since the only difference in principle from the device of FIG. 1 is the change in effective direction of the electric field from vertical to horizontal. Therefore, the operational diagram of FIG. 3 also applies to the device 37 of FIG. 2.

Figure 6:
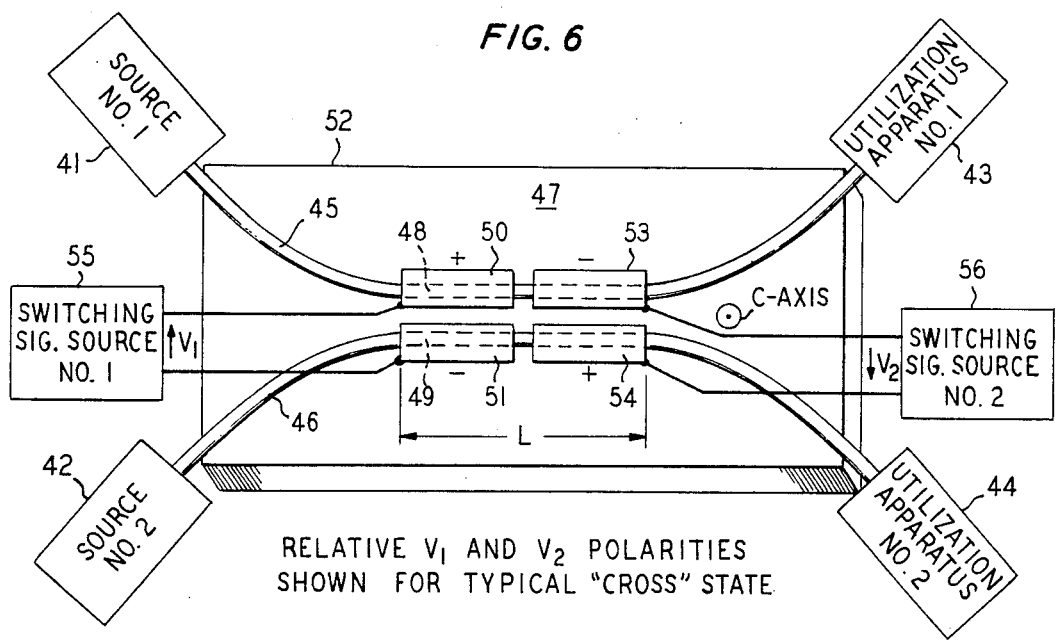
FIGS. 6 and 7 show two alternative arrangements, partly in pictorial form and partly in block diagram form, of fully adjustable optical switches according to our invention.

Turning now to the novel device of the present invention as shown in FIG. 6, we see that, as compared to the device 17 of FIG. 1, the device 47 includes similar sources 41, 42 and apparatuses 43 and 44 and even a similar substrate 52 and guides 45 and 46 with parallel portions 48 and 49, the C-axis being normal to the surface of substrate 52.

The difference resides in dividing the coupling region into two sequential sections, the first of which includes electrodes 50 and 51, and the second of which includes electrodes 53 and 54. Illustratively, these pairs of electrodes 50, 51 and 53, 54 are driven by switching signal sources 55 and 56 respectively, which supply voltages $V_1$ and $V_2$ respectively, and are connected to the electrode pairs 50, 51 and 53, 54 so that the relative polarities of voltages in two sequential sections are opposite.

In this case, even if the distance $L$ is not an odd integral multiple number of coupling lengths $l$, the two sequential sections of electrodes give the operator an additional handle for satisfying the simultaneous conditions which must be met for the cross state of the switch.

Indeed, this additional variable allows the cross state to be achieved with asynchronous coupling at all points, since it is well known tht asynchronous coupling can result in a substantial partial transfer of power. At that point of partial transfer, the first section ends; and the second section operates just as it would to have achieved asynchronous coupling of the complementary proportion of the optic wave if the latter had started at the right-hand end and proceeded toward the middle. Nevertheless, since the waves are actually propagating from left to right, the partially coupled state of the interacting waves is now "undone" by returning the as yet uncoupled portion of the wave to the other guide as if it were previously coupled energy being returned to its original guide by phase mismatch.

Figure 8:
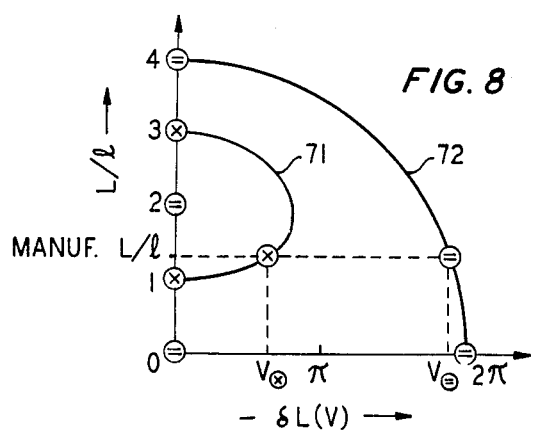
FIG. 8 shows a modified diagram useful in explaining the operation of embodiments of FIGS. 6, 7, 9 and 10.

The operation of the switch in FIG. 6 can now be illustrated by the curves 71 and 72 in FIG. 8, which shows that there now is a continuous curve for the cross state of the switch as shown by curve 71. For example, assume that the length L as manufactured is slightly greater than one coupling length, the cross state of the switch is now achieved at a voltage which is something less than the voltage for the normalized $\pi$ value of $\delta L(V)$.

In mathematical terms, each of the individual sections in FIG. 6 is described by a transfer matrix of the form of Equation (2) with coefficients related by $$A(-\Delta\beta) = A^*(\Delta\beta), \ B(-\Delta\beta) = B(\Delta\beta). \qquad (5)$$

The overall transfer matrix is obtained by matrix multiplication. It is again of the form of Equation (1) with the coefficients $$A = 1 - 2\sin^2\left(\frac{L}{2}\sqrt{\kappa^2+\delta^2}\right)/[1+\delta^2/\kappa^2] \qquad (6A)$$

$$B = \frac{\kappa}{\sqrt{\kappa^2+\delta^2}}\left\{\sin\left(L\sqrt{\kappa^2+\delta^2}\right) - 2j\delta \sin^2\left(\frac{L}{2}\sqrt{\kappa^2+\delta^2}\right)/\sqrt{\kappa^2+\delta^2}\right\} \qquad (6B)$$

Through these equations we obtain the conditions necessary to achieve the bar and cross states; and the results are shown in curves 71 and 72 of FIG. 8. On the vertical axis we get the same points as for the prior art uniform-$\Delta\beta$ configuration but for any applied voltage the situation is different from that of the prior art. Curve 72 is the same as curve 32 as in FIG. 3; but the bar state circle through $Ll = 2$, $\delta L = \pi$ is not present. This is the price we pay to obtain a continuous curve for the cross state.

Nevertheless, we have not lost the lower-valued bar state of the prior art because the given curves 71 and 72 apply only for the relative polarities of voltages indicated in FIG. 6, for example. The arrangement of FIG. 1 can be obtained simply by reversing the relative polarities of the voltages $V_1$ and $V_2$ from sources 55 and 56, so that we obtain curve 31 of FIG. 3 for the bar state of the switch.

Figure 7:
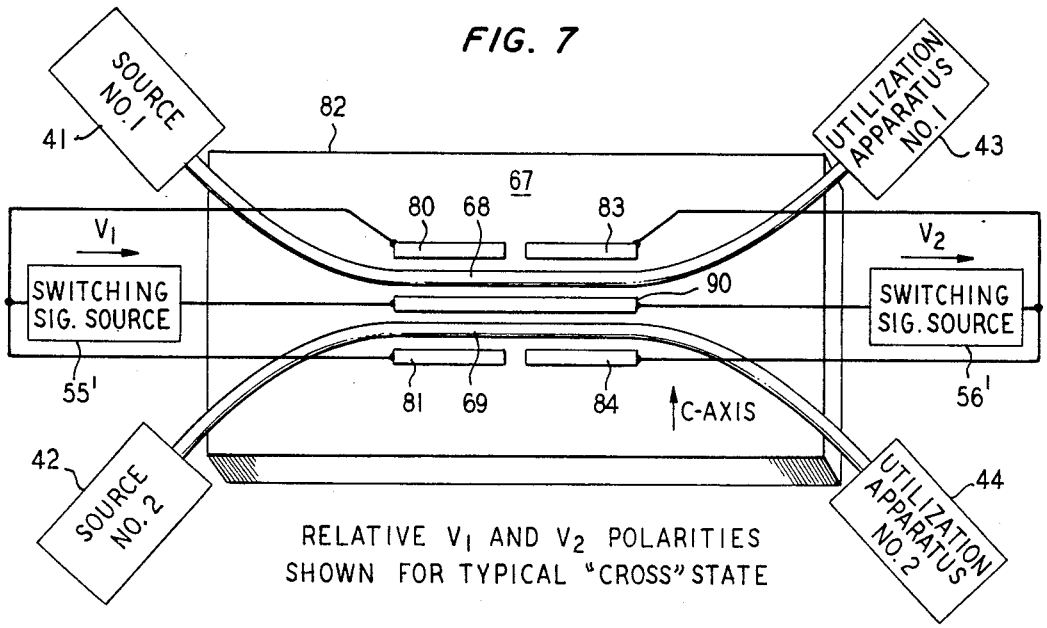

A similar adjustment of the bar state of the switch for zero crosstalk can be achieved by the same technique when the optic axis of the electrooptic material is parallel to the substrate surface. In other words, the switched directional coupler 67 of FIG. 7 is a modification of the prior art switched directional coupler 37 of FIG. 2 with two sequential coupling sections defined within the parallel portions 68 and 69 of the optical strip guides. The sections are defined by the sequentially split electrodes 80, 81, 83 and 84. In order to facilitate the connection of switching signal sources 55' and 56', center electrode 90 is not split. That is, both could be connected to the same contact pad (not shown). Nevertheless, somewhat lower electrical field gradients between the ends of electrodes 80 and 83 and the ends of electrodes 81 and 84 can be achieved if the relatively fine center electrode 90 can be effectively and reliably split.

For the indicated polarities of the voltages $V_1$ and $V_2$ in FIG. 7, the switching diagram of FIG. 8 is still applicable. A change of polarities of one of the voltages allows one as before to revert to curve 31 of FIG. 3 for the bar state of the switch, just as in the embodiment of FIG. 6. Otherwise, one must proceed out to the voltage value for the $L/l = 4$ curve 72 to obtain the bar state of the switch.

The foregoing discussion of variant electrooptic versions of the present invention should not be misinterpreted to restrict the invention to electrooptic control. For example, if one employs aluminum gallium arsenide waveguides in waveguiding-type semiconductor laser configurations, the applied electric field that controls the injection lasing process can also change the effective guide dimension and thereby change $\Delta\beta$. Such control may not be electrooptic in nature. In other words, our invention applies to any type of $\Delta\beta$-switched directional coupler. The same principles of multiple sequential sections, partial coupling and reverse phase-mismatch conditions in the succeeding section can be used to practice our invention, regardless of how the phase-mismatch $\Delta\beta$ is varied.

Figure 9:
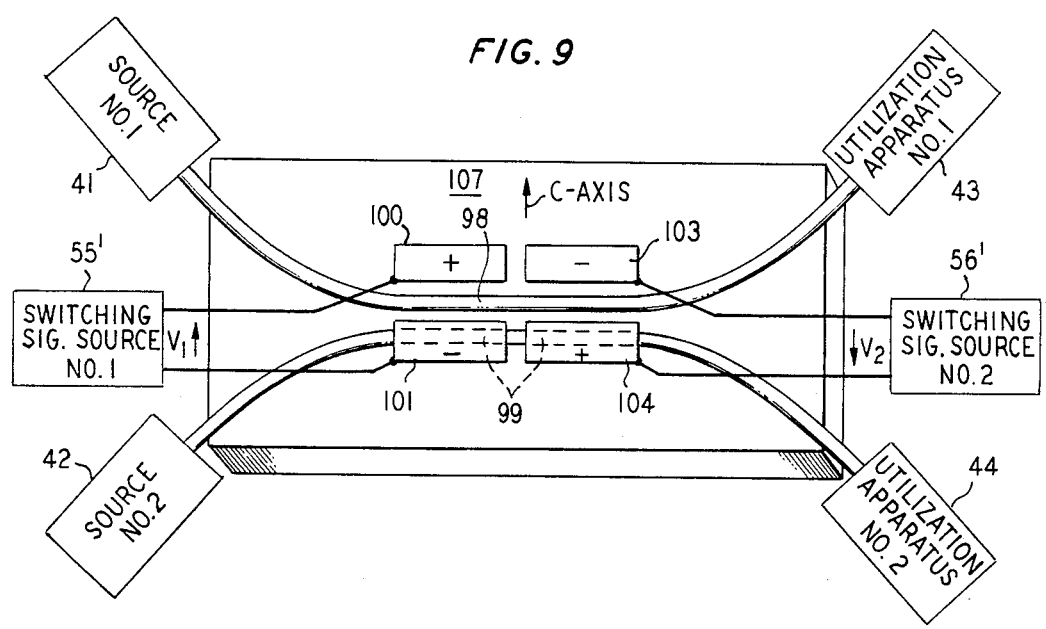
FIGS. 9 and 10 show modifications of the embodiment of FIGS. 6 and 7.
Figure 10:
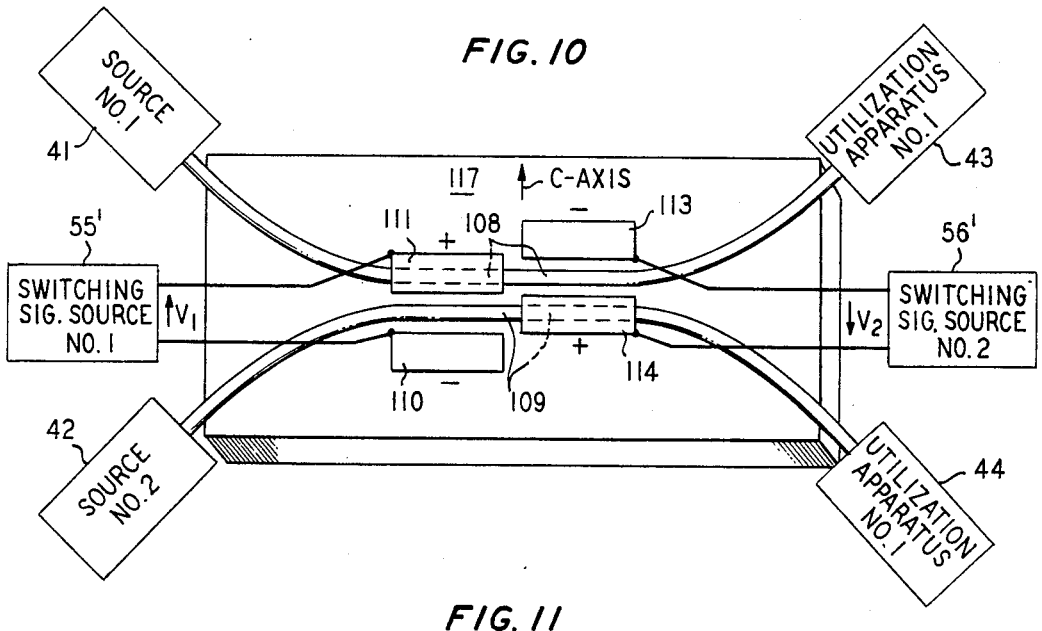

The embodiment of FIG. 7 can be modified to improve its manufacturability in the two ways shown in FIGS. 9 and 10. For example, with all other components in FIG. 9 being numbered the same as in FIG. 7, electrode 101 can be considered as a shorting together of electrodes 81 and 90 in FIG. 7, and similarly electrode 104 can be considered a similar combination of electrodes 84 and 90 in FIG. 7, so that most of the switching and adjusting fields must be applied across the section 98 of the strip guides; and relatively little of it is achieved across section 99 of the strip guides. As a result, the required voltage will be larger than in the embodiment of FIG. 7; but the need to produce a very fine center electrode 90 is eliminated. With that qualification in mind, the normalized diagram of FIG. 8 is still applicable and the normalized curve 31 of FIG. 3 is still applicable for the bar state of the switch in the event that one of the voltages $V_1$ or $V_2$ is reversed in polarity.

Similarly, the switched directional coupler 117 of FIG. 10 is similar to the switched directional coupler 107 of FIG. 9 except that the portions of strip guides not subject to electric fields are simply divided between the two sequential sections of switch in a way not locating them both on one strip guide. Electrode 114 is equivalent to electrode 104 in FIG. 9; and electrode 111 equivalent to electrode 101 in FIG. 9, as disposed over the other strip guide 108 in the first section of the switched directional coupler. The polarities of voltages $V_1$ and $V_2$ remain as shown in FIG. 9. All other components in FIG. 10 remain the same as in FIG. 7.

In brief, the performance of the switching devices of the embodiments of FIGS. 6, 7, 9 and 10 is sufficiently improved over prior art devices with respect to reduced crosstalk in the cross state of the switches and, indeed, in adjustability of both switching states that it is feasible to employ them in a complicated electrooptic switching matrix such as would be practical in an optical telecommunication system. Such a switching arrangement is shown in FIG. 11.

Figure 11:
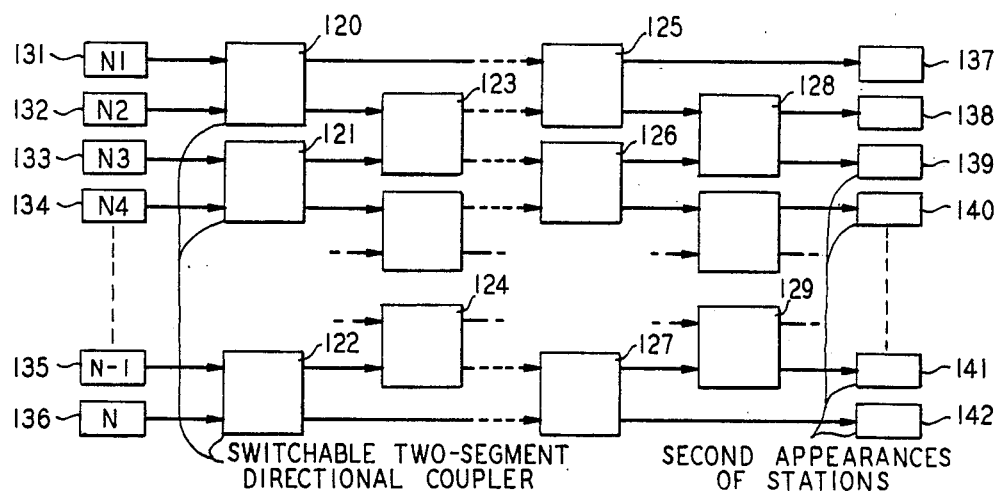
FIG. 11 shows a block diagram of a typical switching system employing switches according to the invention.

The switching arrangement of FIG. 11 is basically modeled upon that of A. E. Joel, Jr., U.S. Pat. No. 3,593,295, issued July 13, 1971, as later proposed in optical form by H. F. Taylor, *Electronics Letters (GB)*, Volume 10, page 41 (Feb. 21, 1974). The principal difference from the optical system of the Taylor reference is the use of our new switchable two-segment directional couplers having both switching states adjustable. That is, each of the switches 120 through 129 is such a switch. In connecting the first appearances of station 1 through n labeled 131, 132, 133, et cetera; for example, to the second appearances of the same stations labeled as 137, 138 and 139, et cetera; in the embodiment in FIG. 11, such a switching system will not only have the improved crosstalk characteristics of our invention but will also be a nonblocking communication system for all of the customers or facilities therein.

Figure 12:
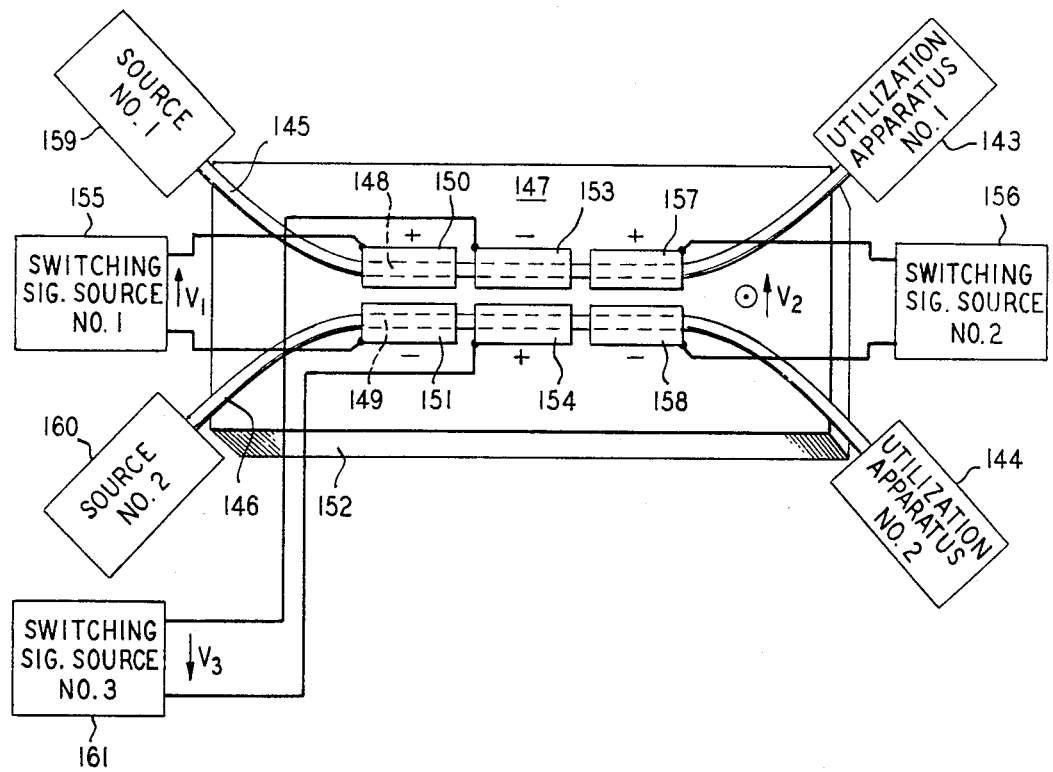
FIG. 12 shows an optical switch according to our invention having more than two sequential sections.

FIG. 12 illustrates that our invention can be extended beyond two sequential segments of the phase-matched coupling portion of the switchable directional coupling device 147. It includes again the modulated signal source such as sources 141, 142 and the appropriate detectors for utilization apparatuses 143 and 144. As before, the system can be reciprocal. Over the parallel portions 148 and 149 of strip guides 145 and 146 which are disposed on substrate 152, all illustratively of lithium niobate with appropriate index and with optic axis normal to the major surface, are disposed electrodes 150, 151, 153 and 154, and 157 and 158. Each pair of electrodes defining one of the sequential segments is connected to a separate switching signal source, such as sources 155, 156 and 161, in the illustrative embodiment of FIG. 12; and electrodes 150, 151, 153 and 154 and 157 and 158 are connected in pairs across the switching signal sources 155, 161 and 156, respectively, in successively opposite polarities.

Figure 13:
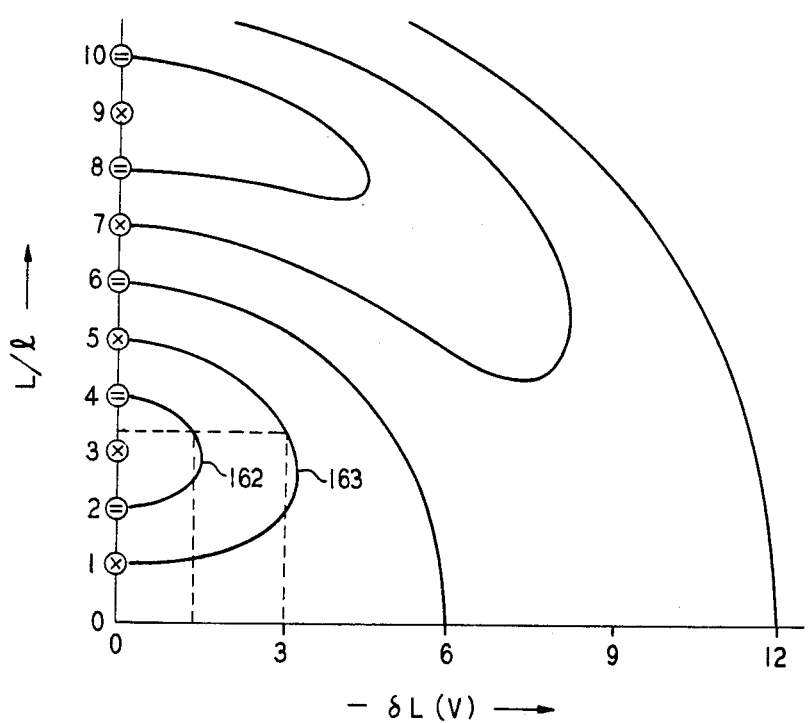
FIG. 13 shows a modified diagram useful for explaining the operation of the embodiment of FIG. 12.

For the illustrated arrangement, in operation the first two pairs of electrodes for the first two segments of the switchable directional coupler experience oppositely poled drives $V_1$ and $V_3$, as may be determined for a first approximation to control of the cross state of the switch. The voltage $V_2$ may then be adjusted for a vernier control in the overall effect. The control diagram for the embodiment of FIG. 12 is shown in FIG. 13. If, for example, one chooses a length of the parallel portions 148 and 149, which is slightly more than three coupling lengths long, one can find appropriate points on the curves 162 and 163 to provide precisely the cross and bar states of the switch. The horizontal axis or abscissa is measured in terms of multiples of $\pi$ for the normalized voltage parameter. This normalized parameter represents the net relative phase shift, $\Delta\beta$, for the three sections. It will be seen that no relative switching of polarities is needed to provide the required drive voltages practiced in this embodiment. In other words, curve 162 as a practical matter requires not significantly more drive voltage than would curve 31 of FIG. 2, for the nonsegmented electrode case.

There may be indeed many other advantages to the use of the multiply-segmented embodiment of FIG. 12. It is clear that the use of three segments gives still an additional handle of control over the system, thereby allowing one to satisfy yet another objective in addition to those outlined above.

It should be clear that our invention involves sequential control of asynchronism in multiple section optical waveguides and that the asynchronism can be induced by other than electrooptic means or even by other than electric fields. For instance, the $\Delta\beta$ mismatch can be induced by mechanical loading of the guides which effects the optical propagation properties, by magneto-optical variation of $\Delta\beta$ phenomena, by acousto-optical variation of $\Delta\beta$, and in semiconductors by changing a waveguide parameter via the injection voltage or current.

Moreover, the guides may be any type of optical waveguides whether of deposited planar type or diffused type, or possibly others.

What is claimed is:

1. A switch comprising a pair of waveguides having mutually parallel portions in sufficient proximity for $\Delta\beta$-switched directional coupling therebetween, and control means comprising at least two sets of control elements disposed about said parallel portions of said waveguides and coupled sequentially thereto to define at least two asynchronous sequential coupling sections along said parallel portions, and means for supplying control signals to make the phase mismatch of opposite sign in two sequential ones of said sections to achieve a cross state.

2. A switch according to claim 1 in which the waveguides comprise optical waveguides comprising electrooptic material and the control means comprise at least two sets of electrodes disposed about said parallel portions of said waveguides and coupled sequentially thereto.

3. A switch according to claim 2 in which the electrodes are disposed to provide in said portions an electric field normal to the common plane of said parallel portions.

4. A switch according to claim 2 in which the electrodes are disposed to provide in said portions an electric field parallel to the common plane of said parallel portions.

5. A switch according to claim 2 in which the set of electrodes include a center electrode and are disposed to provide in said portions an electric field parallel to the common plane of said parallel portions.

6. A switch according to claim 2 in which the set of electrodes are disposed one over and one adjacent to respective parallel portions to provide in said portions an electric field parallel to the common plane of said parallel portions.

7. A switch according to claim 6 in which the successive sets of electrodes have a staggered arrangement of electrodes over and adjacent the parallel portions to provide in said portions an electric field parallel to the common plane of said parallel portions.

8. A switch according to claim 2 including means for driving the successive sets of electrodes with respectively opposed polarities of voltages.

9. A switching system comprising a plurality of optical switches, each of said optical switches comprising a pair of optical waveguides having mutually parallel portions in sufficient proximity for phase-matched coupling therebetween, and control means comprising at least two sets of control elements disposed about said parallel portions of said waveguides and coupled sequentially thereto to define two sequential coupling sections along said parallel portions, and means for selectively applying the signals to said control elements to generate bar and cross states characterized by asynchronism.

10. A switching system according to claim 9 in which the control elements and control signals in the sequential sections are mutually adapted to provide asynchronism of opposite polarity and different values in the sequential sections.

11. An optical switch comprising a pair of optical waveguides having mutually parallel portions in sufficient proximity for $\Delta\beta$-switched directional coupling therebetween, and control means having subdivided parts thereof coupled to said parallel portions to define at least three sequential sections of said parallel portions, and means for supplying signals to said parts of said control means associated with said sections to provide asynchronism of alternating sign from section to section of the sequential sections.

12. An optical switch according to claim 1 in which the means for supplying control signals includes means for supplying phase mismatches of like polarity to achieve a bar state.

* * * * *